(12) United States Patent
Early et al.

(10) Patent No.: US 6,302,682 B1
(45) Date of Patent: Oct. 16, 2001

(54) LASER CONTROLLED FLAME STABILIZATION

(75) Inventors: James W. Early, Los Alamos, NM (US); Matthew E. Thomas, Huntsville, AL (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/259,469

(22) Filed: Feb. 26, 1999

Related U.S. Application Data

(60) Provisional application No. 60/076,169, filed on Feb. 27, 1998.

(51) Int. Cl.[7] .................................................. F23Q 21/00
(52) U.S. Cl. ........................ 431/1; 431/1; 431/6; 431/74; 431/79; 431/258
(58) Field of Search ............................... 431/1, 6, 12, 19, 431/74, 79, 255, 258; 123/143 R, 143 B, DIG. 9; 60/39.06, 39.821

(56) References Cited

U.S. PATENT DOCUMENTS

| | | | |
|---|---|---|---|
| 3,473,879 | * 10/1969 | Berberich | 431/258 |
| 4,302,933 | * 12/1981 | Smith | 60/261 |
| 4,434,753 | * 3/1984 | Mukainakano et al. | 123/143 B |
| 4,702,808 | * 10/1987 | Lemelson | 204/157.41 |
| 4,852,529 | * 8/1989 | Vowles | 123/143 B |
| 5,497,612 | * 3/1996 | Few et al. | 431/6 |
| 5,588,299 | * 12/1996 | DeFreitas | 431/266 |
| 5,829,962 | * 11/1998 | Drasek et al. | 431/12 |
| 5,876,195 | * 3/1999 | Early | 431/258 |

* cited by examiner

Primary Examiner—Sara Clarke
(74) Attorney, Agent, or Firm—Gemma Morrison Bennett

(57) ABSTRACT

A method and apparatus is provided for initiating and stabilizing fuel combustion in applications such as gas turbine electrical power generating engines and jet turbine engines where it is desired to burn lean fuel/air mixtures which produce lower amounts of $NO_x$. A laser induced spark is propagated at a distance from the fuel nozzle with the laser ignitor being remotely located from the high temperature environment of the combustion chamber. A laser initiating spark generated by focusing high peak power laser light to a sufficiently tight laser spot within the fuel to cause the ionization of air and fuel into a plasma is unobtrusive to the flow dynamics of the combustion chamber of a fuel injector, thereby facilitating whatever advantage can be taken of flow dynamics in the design of the fuel injector.

16 Claims, 5 Drawing Sheets

LASER CONTROLLED FLAME STABILIZATION

This application claims the benefit of U.S. Provisional Application No. 60/076,169, filed Feb. 27, 1998.

This invention was made with government support under Contract No. W-7405-ENG-36 awarded by the U.S. Department of Energy. The government has certain rights in the invention.

TECHNICAL FIELD

This invention relates to use of laser technology for hydrocarbon fuel combustion.

BACKGROUND ART

Natural gas burning power sources such as gas turbine electrical power generating plants are operated with as lean fuel/air mixtures as practical in order to reduce the production of $NO_x$ emissions. Conventional pilot light flames which burn rich fuel/air mixtures and electrical spark plugs have been used for initiating and stabilizing flames in gas burning turbines. However, when lean fuel mixtures are used, the use of a pilot light with a richer fuel/air mixture is necessitated to stabilize the flame because otherwise, at fuel/air composition mixtures near the flammability limit, the combustion process becomes so unstable that the flame cannot be sustained. The richer burn of the pilot flame itself produces a higher flame temperature which contributes significantly to the over-all production of $NO_x$.

Therefore, a method which does not contribute to $NO_x$ pollutant emissions is needed by the power generation industry to stabilize the ultra-lean combustion of fuels.

An object of this invention is to provide an apparatus for laser ignition of hydrocarbon fuels.

It is an object of this invention to provide a method for stabilization of hydrocarbon fuel combustion flames.

It is another object of this invention to provide a method for cleaner combustion of hydrocarbon fuels.

It is a further object of this invention to provide a method of initiating hydrocarbon fuel combustion without contact of the initiator with the burning fuel.

It is yet another object of this invention to provide a method of initiating hydrocarbon fuel combustion that reduces interference with the flow dynamics in the combustion chamber.

Another object of this invention is to provide a means for directing a laser initiating spark into any selected location within a fuel vapor cloud.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method comprising use of a laser-induced spark to initiate and stabilize fuel combustion in applications such as gas turbine electrical power generating engines and jet turbine engines where it is desired to burn lean fuel/air mixtures which produce lower amounts of $NO_x$.

More specifically, a laser spark is generated by focusing laser light to a sufficiently tight laser spot within the fuel to cause the ionization of air and fuel into a plasma. Repeated pulses of high peak power or a dual pulse format of alternating short duration high peak power and long duration low peak power pulses can be used.

The laser may be operated in an intermittent maimer with the laser being fired only when incipient extinction of fuel combustion is detected by using a feedback control unit.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

BEST MODES FOR CARRYING OUT THE INVENTION

Figure 1:
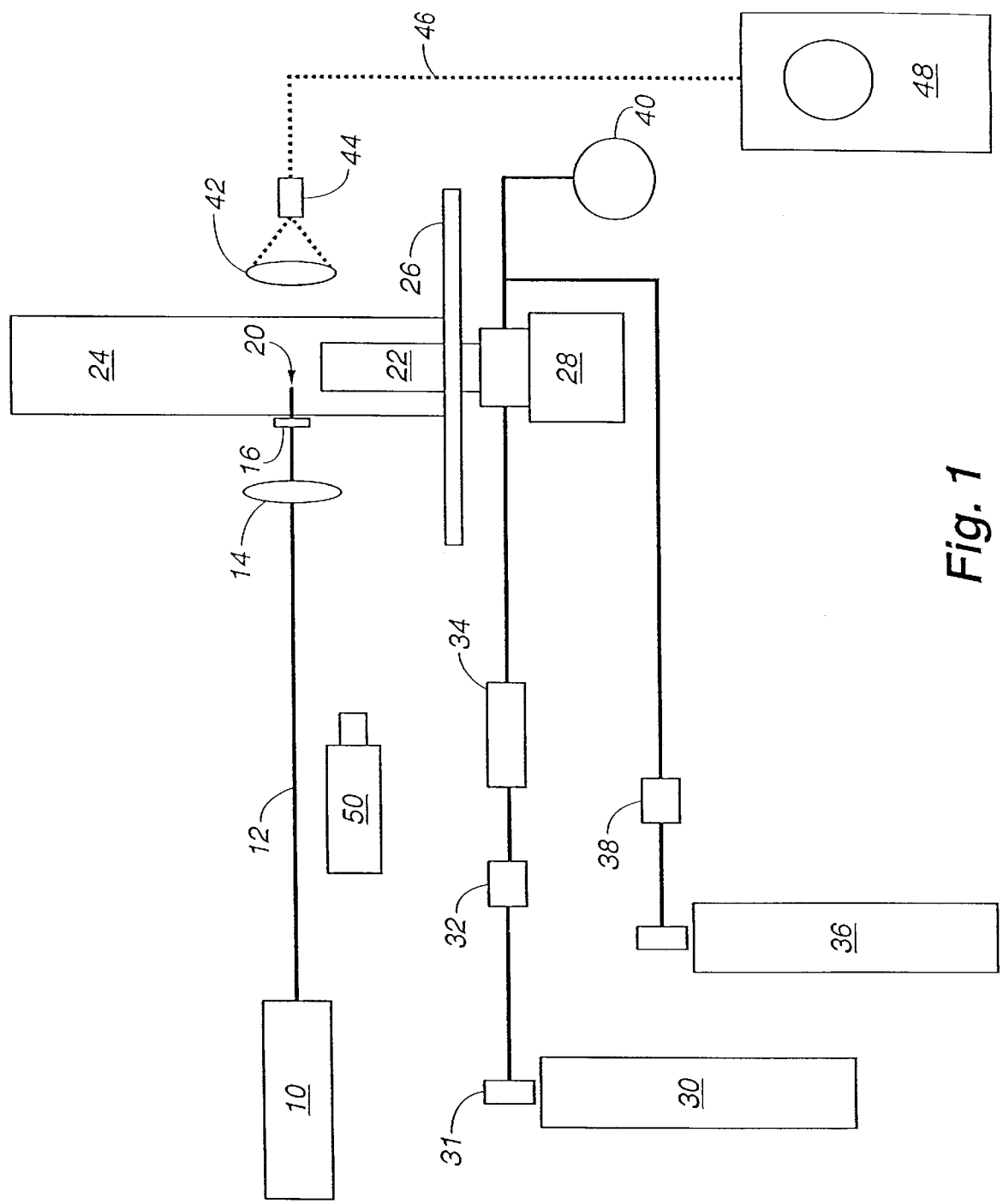
FIG. 1 is a schematic of a set up for one embodiment of the invention.

In the present invention a laser-generated air-breakdown spark which does not contribute to $NO_x$ production accomplishes flame initiation and stabilization in combustion of lean fuel/air mixtures in gas burning turbines.

A laser induced spark is propagated at a distance from the fuel nozzle with the laser ignitor being remotely located from the high temperature environment of the combustion chamber. This arrangement eliminates the costly and frequent maintenance required when spark plugs and pilot flames which require direct contact with the burning fuel are used. The laser initiating spark can be directed to any selected location within the combusting fuel in a manner which is unobtrusive to the flow dynamics of the combustion chamber of a fuel injector, thereby facilitating whatever advantage can be taken of flow dynamics in the design of the fuel injector.

The laser spark is generated by focusing high peak power laser light to a sufficiently tight laser spot within the fuel to cause the ionization of air and fuel into a plasma. The laser light is directed and focused into a region of the fuel/air flow using a short focal length lens (from about 5 to about 30 cm). The extremely hot breakdown plasma produced provides the thermal initiation energy required to sustain the fuel combustion.

Short duration pulses from a Q-switched laser operating at a high repetition rate (from about 10 to about 1,000 Hz) are used to generate the laser spark. The duration of the laser pulse must provide a peak power density within the focal plane of a short focal length lens sufficient to induce the ionization of the fue/air mixture. A short focal length lens is normally needed to provide small enough laser spot sizes and light power density for air breakdown at reasonable laser pulse energies.

The laser power required varies from about 10 kW to about 10 GW, depending upon the laser light wavelength, pressure and fuel/air composition. The wavelength of the laser is not critical to the plasma formation process, although shorter wavelength light in the range from about 200 to about 1500 nm is generally more desirable because fewer laser light photons are required to non-resonantly ionize the fuel/air molecules.

Alternatively, a dual pulse format in which short duration pulses from a Q-switched laser are alternated with long duration pulses from the same laser. The power of the short duration high peak power pulse generally must be in the range from about 10 kW to about 10 GW, depending upon the laser light wavelength, pressure and fuel/air composition. The wavelength of the short duration high peak power pulse is not critical to the plasma formation process, although shorter wavelength light in the range from about 200 to about 1500 nanometers is generally useful.

The power of the long duration low peak power pulse generally must be in the range from about 10 kW to about 100 MW, depending upon the laser light wavelength, pressure and fuel/air composition. Again, the wavelength of the pulse is not critical as long as it is a wavelength that can be efficiently absorbed by the laser induced plasma.

Examples of dual pulse formats which can be used in the practice of this invention are set forth in the specification of U.S. Pat. No. 5,756,924 issued May 26, 1998.

The location of the laser spark within the fuel flow and the number of laser sparks applied to the fuel required to stabilize a lean burn combustion will depend upon the size and configuration of the specific fuel injector nozzle. A single laser induced spark centered within the annular fuel output aperture is sufficient to anchor and stabilize the combustion of lean natural gas/air mixtures in a manner equivalent to the flame ignition and stabilization provided by a pilot flame.

However, if desired, multiple laser spark initiation locations may be used to achieve flame stabilization when larger fuel injection nozzles are used. The laser sparks can be generated at distributed locations within the fuel flow of the injection nozzle to achieve greater stabilization of the flames. The multiple sparks can be produced simultaneously or may be applied in a rapidly sequenced manner.

A single laser or multiple lasers may be used to generate the initiating sparks. A high switching speed laser light multiplexer such as that described in patent application Serial No. 60/076,301 filed Feb. 27, 1998 is ideal for applications in which stabilizing laser light from a single, high repetition rate laser source is directed at various points within the fuel flow from a single injector or even to various points within multiple injection nozzles.

The pulsed laser may be operated continuously, providing a fuel initiating spark at the fixed repetition of the laser. Alternatively, the laser may be operated in an intermittent manner, where the laser is fired only when incipient extinction of fuel combustion is detected. With intermittent operation, a feedback control loop is utilized to command the laser firing in response to changes in the flame temperature, light emission from the fuel combustion or combustion chamber pressure as the impending flame extinction diagnostic.

An example of how one embodiment of the invention apparatus can be set up is shown in FIG. 1. For combustion of a methane/air fuel mix in a turbine engine, a Q-switched Nd:YAG laser 10 is positioned so as to direct laser light beam 12 through a short focal length lens 14 and through a laser window 16 into a combustion chamber 24. The laser light is focused through the focusing lens 14 to a focal point 20 within a fuel cloud from a fuel nozzle 22. The fuel nozzle 22 is mounted on an X-Y translator 28 so that it can be moved in a horizontal plane relative to a fixed laser spark located above the fuel nozzle 22. Hydrocarbon fuel and air are supplied either from storage bottles 30 and 36 or another source. Gas conduits from the fuel source 30 and air source 36 to the fuel nozzle 22 have throttle valves 32 and 38 for adjusting the flow and the conduit from the fuel source 30 has a flowmeter 34 for more accurate control of the fuel flow. A pressure gauge 40 can be used for monitoring the pressure of the fuel/air mix entering the fuel nozzle 22. The rate of air flow can be monitored by measuring pressure differential across an aperture in the air conduit.

A flame emission collection lens 42 is positioned to direct light emissions from the flame into a photodiode 44. The photodiode 44 is connected to an oscilloscope 48 for monitoring flame emission intensity as a function of time.

In this example, a CCD digital camera 50 can be positioned to make a photographic record of the flame performance. Alternatively, other types of imaging cameras could be used if it is desired to make records of flame performance.

Figure 2:
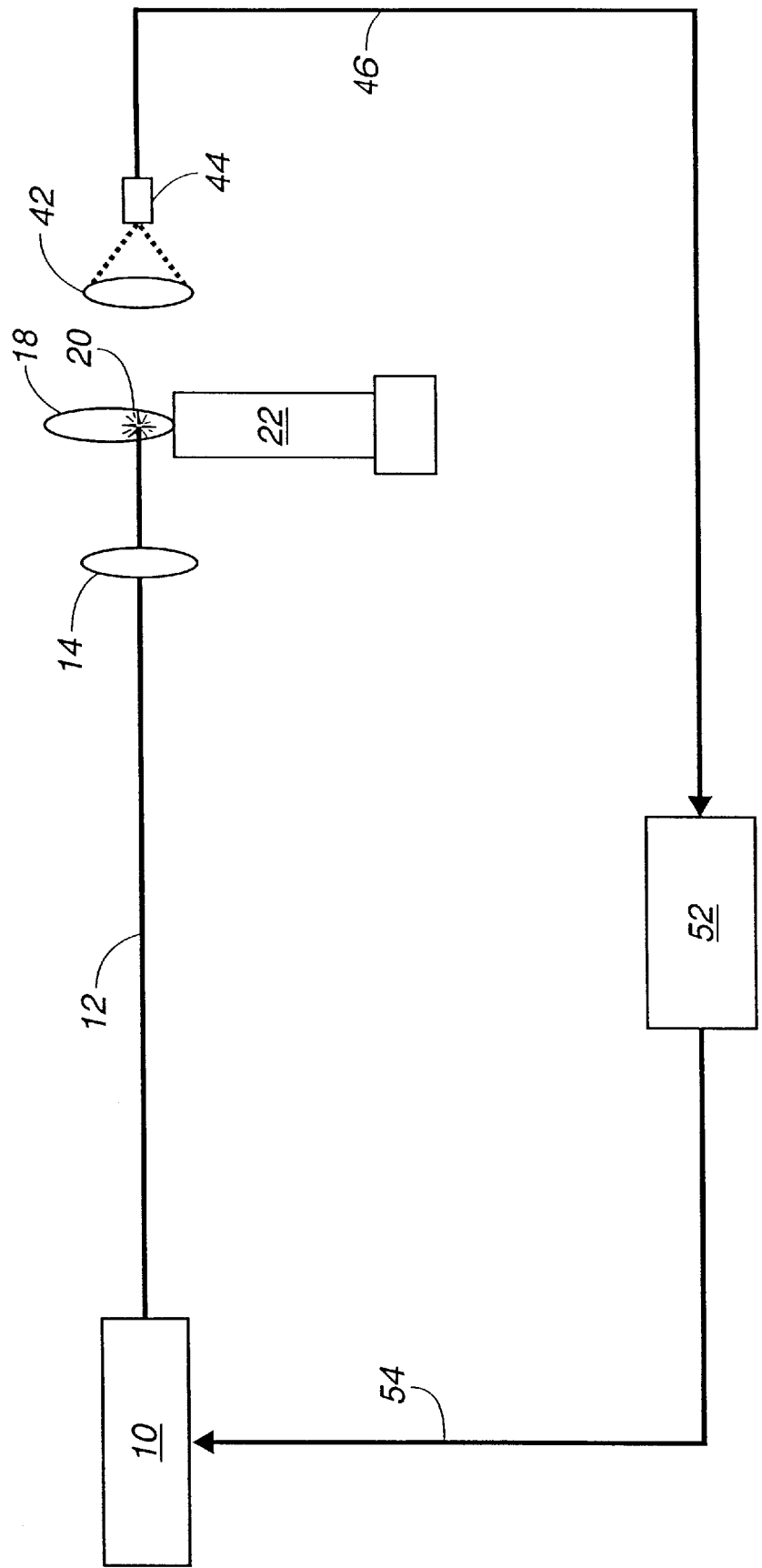
FIG. 2 is a schematic of a feedback control system for flame stabilization.

Rather than continuously running the laser, running the laser on a pre-set time table, or manually running the laser, the laser can be reactivated as needed on an on-call basis using any of a variety of control systems. FIG. 2 shows a schematic of an example of an active feedback control apparatus and method of flame stabilization in accordance with the present invention.

Since the laser is pulsed only when needed rather than providing a continuous train of laser pulses when an active feedback control apparatus is employed, the time averaged power requirements of the laser are significantly lower. Significantly lower power requirements substantially reduces the physical size of the laser needed. An example of this is described in Example VI.

Cleaner dependable combustion of hydrocarbon fuels is accomplished with the methods and apparatuses of this invention. Hydrocarbon fuel combustion initiation and flame stabilization can be provided without contact of the initiator with the burning fuel and with minization of interference with the flow dynamics of the combustion chamber.

The invention can enable significant pollution reduction in the electrical power generation industry. The flame stabilization methods of this invention can also be useful for pressure fluctuation dampening in operation of turbine engines which would substantially reduce maintenance and prolong engine lifetimes. The invention methods and apparatuses have similar applications to aircraft turbine engines.

EXAMPLES

The following examples will demonstrate the operability of the invention. In the following examples, a series of test runs were made to determine the ability of a laser generated air breakdown spark to stabilize the lean burn combustion of methane/air mixtures in accordance with the invention. Flame stabilization was characterized as a function of methane/air mixture composition, total gas flow rate, laser pulse repetition frequency and laser spark location within the combustible gas flow. In Examples IV and V, performance of the invention method was compared directly with performance of a continuous pilot flame of the kind typically used for the selected conditions.

In each of the examples, a swirl injected natural gas nozzle designed and fabricated by CFD was used for fuel introduction. The swirl injected natural gas nozzle was a 1/20-scale version of an injector used for commercial electric power turbines.

A Q-switched Nd:YAG laser, pressure and flow monitoring instrumentation, equipment for collection and photodetection of light emission of the flame, and equipment for video recording of the combustion process were set up as shown schematically in FIG. 1. The laser light source utilized was a Quantronics™ Model DCR-3 Q-switched Nd:YAG laser.

Methane and air flows were obtained from gas bottles connected to the fuel nozzle by about 30 feet of 1/4 inch diameter copper tubing. Air and methane feed lines were connected to the lower section of the swirler nozzle where the incoming gases are initially mixed.

Regulation of gas flows was provided by control of throttling valves and gas bottle pressures. The flow of methane was monitored using a Hastings™ flowmeter with a range of 0 to 50,000 sccm/sec located in the gas feed line between the gas supply bottle and the fuel injector nozzle. The flowmeter used was factory calibrated for air flow rather than for methane, necessitating the application of a correction factor to provide the true methane flow. Since a gas flowmeter with sufficient range to directly measure the higher flow rate of air was not used for the runs described herein, the differential pressure at the nozzle inlet was monitored as an indicator of air flow setting. This provided the means to adjust air flow in a reproducible manner from experiment to experiment, although it did not provide a direct measurement of air flow. A calibration was performed off-line which permitted the recovery of actual air flow values from the measured delta P.

The premixed, lean burn nozzle and gas supply bottles were located out of doors in order to permit the combustion of larger fuel flows. The nozzle was oriented vertically so that the combustion gases would flow upwards. The nozzle was attached to an X-Y translator which permitted movement of the nozzle along vertical and horizontal axes. Use of the X-Y translator allowed movement of the nozzle relative to the spatially fixed laser light focal point in order to initiate the laser spark at various locations within the nozzle fuel flow.

The nozzle was operated both with and without a combustion tube enclosure surrounding the nozzle. The combustion tube consisted of a 3-foot long, 6-inch diameter length of fused quartz tubing. The combustion tube limited the entrainment of ambient air within the fuel/air flow from the nozzle and reduced modifications to the flame front by wind currents.

A 0.5 inch diameter hole was cut in the wall of the tube over which a flat, thin quartz window was attached to permit the introduction of laser light. The top end of the tube was left open to allow the escape of combustion product gases while the lower end was sealed against a flat metal plate 26.

A 2-inch diameter hole cut in the metal plate 26, through which the upper half of the nozzle protruded, permitted a +/−1-inch lateral movement of the nozzle.

A sheet of mica was used to seal the annular area between the outer wall of the nozzle and the perimeter of the hole (not shown in FIG. 1). Four 0.5-inch diameter holes were cut in the mica sheet in order to permit outside air to be drawn in to the combustion tube volume. When desired, these holes were covered to eliminate any air flow from below the nozzle.

The laser used to generate the air breakdown spark was a Q-switched Nd:YAG laser providing an output energy of 95 mJ within a pulse of 12-ns duration (FWHM). The laser was operated at pulse repetition rates of from 1 to 23 Hz. The 1064 nm light output of the laser was propagated over a distance of about 30 feet to the combustion flame location. A 10 cm focal length lens was used to focus the multiple transverse mode laser light to a spot diameter of about 60 microns (FWHM) at the focal plane of the lens.

The emission of light from the burning fuel was monitored as a combustion diagnostic tool characterizing the stability of the lean burn combustion process. A 2-inch diameter, 5-cm focal length lens was used to collect and focus the flame emission upon a silicon photodiode. The silicon photodiode was sensitive to both the white light emission from the methane flame as well as the infrared output of the laser.

A video camera was also used to monitor and record the flame stabilization achieved in each of the runs.

Example I

A set of 12 runs was made to investigate the lean blowout limit for various flows of methane and air with and without the presence of the laser spark stabilization.

The laser was operated at an output pulse energy of 95 mJ and at a repetition rate of either 1 or 3 Hz. The spark generated by the focused laser light was positioned about 3 mm above the top of the nozzle and at the middle of the annular area of the nozzle output, thus permitting recirculation of the lean fuel/air mixture.

In the 12 runs of this example, the combustion tube was placed over the nozzle and oriented so that the tube window was centered upon the focused laser light. Also, the air holes below the nozzle were closed to prevent the entrainment of outside air.

Fuel was introduced to the nozzle and ignited by applying a laser spark. The laser light was then blocked and air flow to the nozzle was established. Air flow was then adjusted to the desired ΔP and maintained at that setting. With the laser off, the flow of methane was slowly reduced until combustion was extinguished. Air flow ΔP and methane flowmeter readings were recorded at the extinction condition. The same blowout measurement procedure was repeated during the application of laser light.

A summary of the experimental conditions and blowout measurements for Runs 1 through 12 is shown in Table 1. The blowout limit typically was reduced by a factor of 3 to 5% by the application of the laser spark over the range of fuel and air fuel conditions tested.

TABLE 1

| Run | Air Pressure, psia | Pulse Frequency | LBO Wf[a] |
|---|---|---|---|
| 1 | 17.5 | 0 | 10,000 |
| 2 | 17.5 | 1 | 9,500 |
| 3 | 17.5 | 3 | 9,500 |
| 4 | 20 | 0 | 12,000 |
| 5 | 20 | 1 | 11,500 |
| 6 | 20 | 3 | 11,500 |
| 7 | 25 | 0 | 16,500 |

TABLE 1-continued

| Run | Air Pressure, psia | Pulse Frequency | LBO Wf[a] |
|---|---|---|---|
| 8 | 25 | 3 | 15,250 |
| 9 | 30 | 0 | 20,000 |
| 10 | 30 | 3 | 19,000 |
| 11 | 40 | 0 | 28,000 |
| 12 | 40 | 3 | 27,000 |

[a]LBO Wf is lower blow-out limit of fuel flow in SCCM.

Example II

A second set of runs were made in a manner identical to that described above for Runs 1 through 12 with the exception of the addition of entrained air obtained by opening in the combustion tube below the nozzle.

About the same results were obtained as in the first series of runs with approximately a 5% difference between invention stabilized and comparison unstabilized output limits. In each of these runs, a considerable flicker in the light output of the flame was observed near the extinction limit under both the laser stabilized and free burn conditions.

TABLE 2

| Run | Air Pressure, psia | Pulse Frequency | LBO Wf |
|---|---|---|---|
| 13 | 17.5 | 0 | 9,750 |
| 14 | 17.5 | 3 | 9,500 |
| 15 | 25 | 0 | 16,500 |
| 16 | 25 | 3 | 15,500 |
| 17 | 40 | 0 | 29,000 |
| 18 | 40 | 3 | 28,500 |

[a]LBO Wf is lower blow-out limit of fuel flow in SCCM.

Example III

A set of fourteen lean-burn runs (Runs 19–32) at higher laser pulse rates was made.

In each of the runs of this example, the laser spark, generated by a single 95 mJ laser pulse was introduced to the fuel at a higher pulse repetition frequency, 10 Hz, to determine its effect upon the blowout limit. For these runs, the laser spark was centered in the annular region of the nozzle and positioned so that the unfocused laser light would cross the nozzle axis.

The spark was positioned about 3 mm off the top of the burner head. The air flow holes below the nozzle were closed.

To determine blowout limits with and without laser stabilization, the methane flow was reduced while air flow was fixed. The results of these runs arc given in Table 3.

Using the air flow calibration curve, the methane conversion factor and the stoichiometric molar ratio for methane-air combustion (0.105), the percent of stoichiometric composition for these lean-burn conditions was calculated and included in Table 3.

TABLE 3

| Run | Laser | Pulse Rate | Air Pressure psia | Methane Flow, sccm | Stoichiometric Composition, %[a] at Blowout |
|---|---|---|---|---|---|
| 19 | off | | 25 | 16,500 | 61.5 |
| 20 | on | 10 Hz | 25 | 15,750 | 58.6 |
| 21 | off | | 30 | 21,500 | 57.2 |
| 22 | on | 10 Hz | 30 | 19,750 | 52.0 |
| 23 | off | | 39.4 | 29,000 | 53.6 |
| 24 | on | 10 Hz | 39.4 | 27,750 | 51.2 |
| 25 | off | | 52 | 49,750 | 60.7 |
| 26 | on | 25 Hz | 52 | 45,500 | 53.7 |
| 27 | off | | 36.5 | 30,000 | 62.3 |
| 28 | on | 25 Hz | 41.3 | 30,000 | 53.6 |
| 29 | off | | 49.2 | 45,250 | 64.6 |
| 30 | on | 25 Hz | 58.0 | 45,250 | 57.0 |
| 31 | off | | 52 | 49,750 | 67.8 |
| 32 | on | 25 Hz | 52 | 45,500 | 61.7 |

[a]Fuel to air ratio at blowout.

The results of Runs 19–32 show a small decrease in the lean-burn blowout limit by application of the 10 Hz laser spark of about 2.5 to 5.2% in the stoichometric ratio. In Runs 25–32, the laser repetition rate was increased to 25 Hz.

A larger difference of about 7% in the blowout limits with and without the laser stabilization was observed for the higher air flow conditions of Runs 25–32.

In Runs 27–32, the methane flow was held constant while the air flow was increased until the blowout limit was reached.

In Runs 31 and 32, the quartz combustion tube was removed and the blowout limits then measured at a constant flow of air.

The gas combustion in Runs 31 and 32 was more stable in that the flame emission contained less flame flicker. The stoichimetric ratio was seen to increase substantially, probably due to the entrainment of surrounding ambient air, although the difference between laser off/laser on blowout stoichiometric ratios of 6.1% is comparable to that observed when the nozzle was enclosed within the combustion tube in Runs 25 and 26.

Example IV

A set of runs was made for the purpose of determining causes of flickering of a lean-burn flame and whether flickering lean-burn flames would have gone out without use of the invention method for flame stabilization. To determine the nature of the flame flicker and apparent combustion instability observed, a silicon photodiode was used to monitor the intensity of the white emission of the methane burn as a function of time.

For these test runs, the air flow was set to a pressure of 52 psia. The laser was operated at a 23 Hz pulse rate during these runs. The quartz combustion tube was removed to allow installation of the light sensing instrumentation near the nozzle. Initially, the blowout limit with and without the laser spark was determined to quantify the laser stabilized and free-burn performance.

For the free-burn condition, blowout occurred at a methane flow of 49,750 sccm, read directly from the flowmeter. At this fuel flow rate, the flame typically burned for about 30 seconds before extinction. With the application of the laser light, a visually stable and consistent flame was observed down to a methane flow of 45,500 sccm. The blowout limit for the laser stabilized run was observed to be slightly lower than 42,500 sccm.

Figure 3:
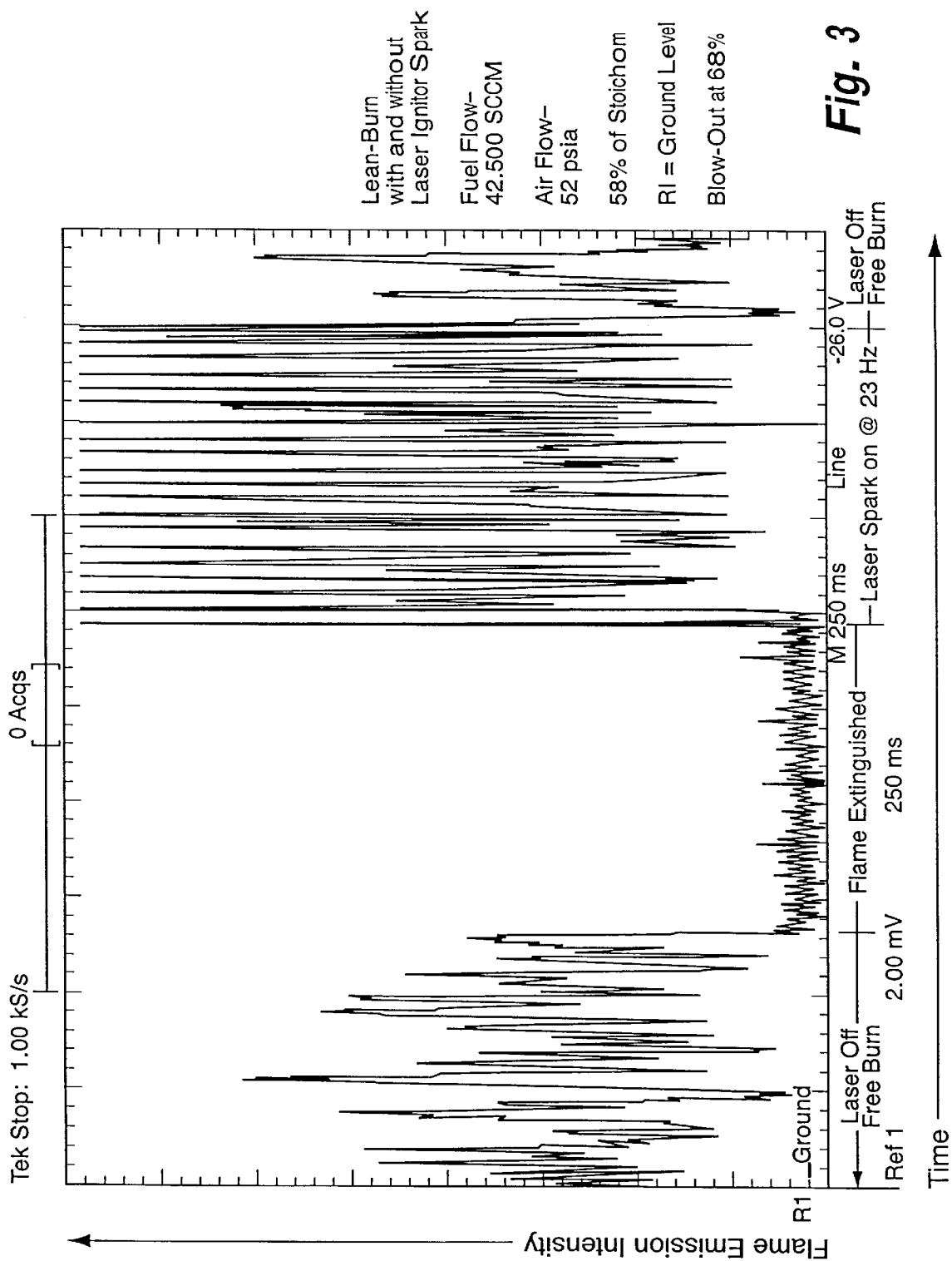
FIG. 3 is an oscilloscope trace of photodetector response to white light emissions from a lean-burn flame operated in accordance with the invention method as described in Example IV.

The flame emission measurements were then performed at this blowout condition. A typical response of the photodetector to the emission of white light from the lean-burn flame is shown in the oscilloscope trace of FIG. 3, where flame emission intensity is presented as a function of time. The time per division in this figure is 250 ms with increasing time to the right. Shown at the left of the figure are the emission characteristics during a period in which the laser spark is not present.

The large variation in flame intensity shows the inherent instability of thermal energy release in the combustion process. After several hundred milliseconds, the flame goes out until the laser spark is introduced and re-ignites the gas, which continues an oscillatory behavior even while the laser spark is on. The sharp, evenly spaced peaks superimposed upon the flame emission trace are due to the pickup of scattered laser light by the photodetector.

Figure 4:
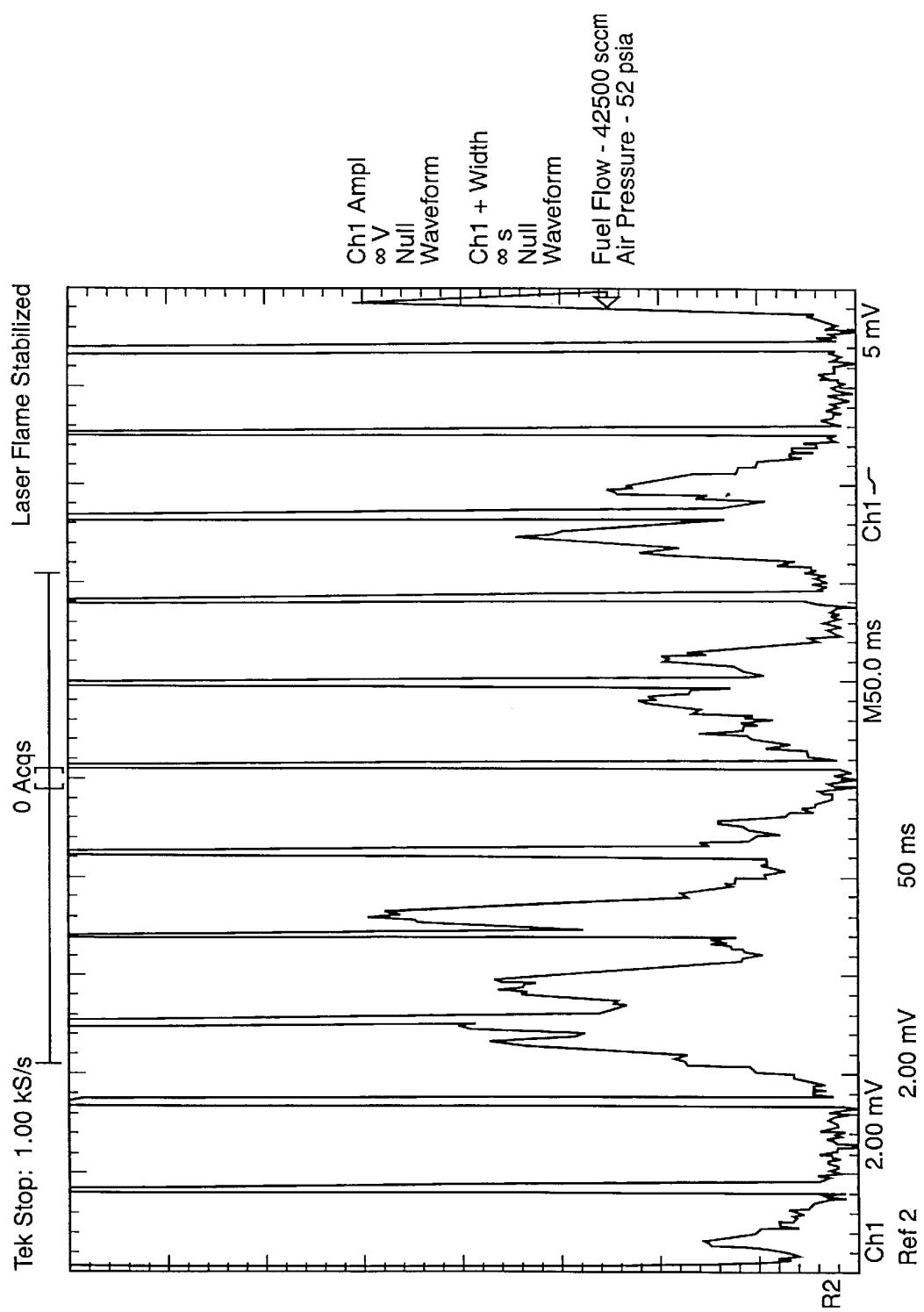
FIG. 4 is an oscilloscope trace at 50 ms/div of photodetector response to white light emissions from a lean-burn flame operated in accordance with the invention as described in Example IV.

A faster time scale (50 ms/div) was used to determine the response of the flame to the application of the laser pulses. These results are shown in FIG. 4.

The oscilloscope trace clearly shows that the laser spark is simply providing a fast re-ignition of the fuel, although apparently the fuel conditions require some time to re-establish an ignitable mixture. This is seen near the left and right hand sides of FIG. 4, where the flame is extinguished and remains extinguished even though a laser spark was produced. The arrival of the next laser pulse provided a re-ignition. In some cases, the fuel was re-ignited with the first laser spark arriving after a blowout. This is seen near the middle of the figure, where a single laser spark has re-ignited the fuel.

Example V

A set of runs was made to determine whether the flame stability performance of the laser spark is substantially different from a piloted flame stabilized combustion because of the rate of energy input or magnitude of energy input.

The runs of this example were performed under identical air and methane flow conditions as described above, except that the laser ignition source was replaced by a pilot flame consisting of a propane torch directed into the gas flow from one side of the nozzle.

Figure 5:
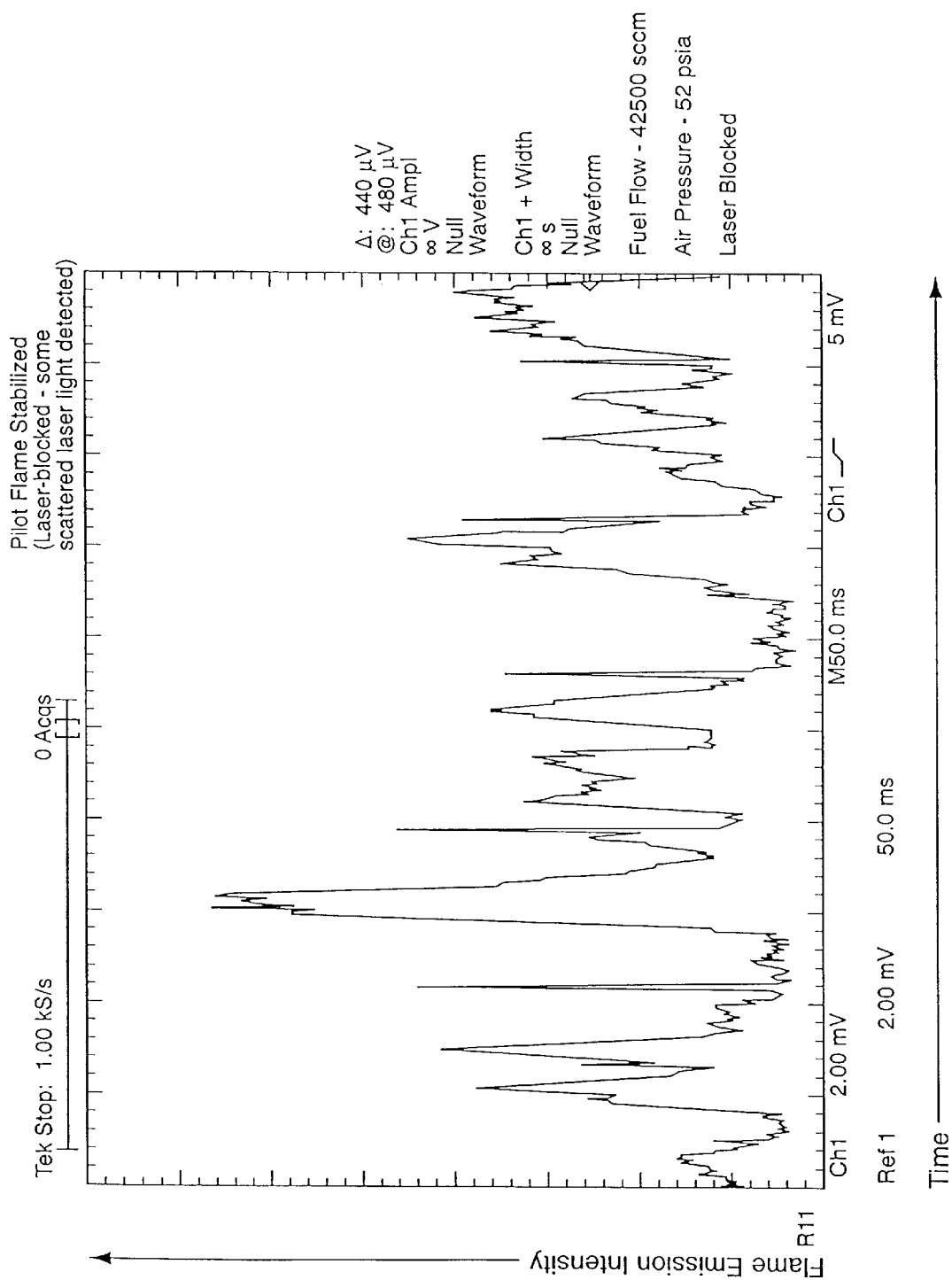
FIG. 5 is an oscilloscope trace of light emissions from combustion during conventional pilot-flame stabilization made for purposes of comparison with the invention method results.

The characteristic flame emission is shown in FIG. 5, where the same oscilloscope vertical and horizontal scale as for FIG. 4 are used. The two lines at the bottom of the trace are the zero light intensity level and the signal level produced by the continuous light emission of the pilot flame (upper line).

Even though the laser was blocked during these measurements, the photodetector sensitivity was high enough to pick-up stray laser light within the experimental area. This gives rise to the sharp peaks observed superimposed upon the broader flame emission peaks seen in FIG. 5.

The stabilization performance of the flame piloted combustion is virtually identical to that provided by the laser. The frequency of flame drop-out and the duration of the flame extinction are similar for both stabilization methods. Apparently the observed flame flicker was driven by composition instabilities in the nozzle operation. The major difference observed was that laser stabilization does not produce polluting combustion products.

Example VI

A set of runs were made to test use of a photodiode and photodiode signal level discriminator as a control device for activating the laser on an on-call as-needed basis in an invention apparatus.

An apparatus for fuel/air mixture combustion in accordance with the invention and as shown in the schematic of FIG. 1 was set up as described in Example I.

As shown in the schematic of FIG. 2, a photodiode 44 was used to monitor the light emitted from the combustion flame 18 under lean fuel/air mixture conditions. The instability of the fuel-lean combustion process as sensed by the photodiode is shown in the oscilloscope tracing of FIG. 3, where the light emission level varied widely with time.

Flame extinction is preceded by a low emission of light from the flame. This phenomenon was used to control the application of laser light to assure sustenance of the lean fuel combustion.

A light collection lens 42 was used to gather light emitted by the combustion flame 18. A photodiode 44 was used to monitor the flame light emission level. The photodiode output 46 was directed into a photodiode signal level discriminator 52 which sent a signal 54 to trigger a laser pulse.

The level of light detected by the photodiode 44 was used to turn on the laser output when the emission level of the flame began to significantly diminish.

The signal level discriminator 52 provided a trigger pulse to fire the laser 10 whenever the photodiode 44 output fell below the pre-set level. Generally, a pre-set level of 10% of the time averaged output of the photodiode 44 was used.

On a time averaged basis, the laser 10 was pulsed at about a 5 Hz rate as directed by the feedback system during stabilization of combustion operating in the lean fuel/air range of about 55 to 60%.

Each pulse output from the laser provided a laser spark within the fuel/air mixture when focused by the focusing lens 14. The maximum pulse rate of the laser was limited to 30 Hz.

When fuel combustion was re-established and flame light emission above the threshold was detected, the laser was turned off until the control once again sensed the light emission level falling below the threshold. Then the feedback control system again commanded the laser to turn on and output a pulse to sustain the flame.

The laser pulsed only when needed rather than providing a continuous train of laser pulses. The lower time averaged power requirement of the laser used in the feedback control system of this example substantially reduced the physical size of the laser needed.

A laser providing a 100 mJ pulse at a 25 Hz rate operates at a power of 2.5 W. On the other hand, a laser responding to flame emission feedback as described in this example required the laser to pulse an average of five times per second, thus reducing laser output power to 0.5 W.

While the apparatuses, articles of manufacture and methods of this invention have been described in detail for the purpose of illustration, the inventive apparatuses, articles of manufacture and methods are not to be construed as limited thereby. This patent is intended to cover all changes and modifications within the spirit and scope thereof.

INDUSTRIAL APPLICABILITY

The method and apparatus of the invention is useful for stabilizing and maintaining combustion of fuel in natural gas burning power sources such as gas turbine electrical power generating plants. Leaner fuel/air mixtures can be used and production of $NO_X$ emissions are reduced when the invention is employed.

That which is claimed is:

1. A method for flame stabilization comprising: focusing a pulsed high peak power beam from a laser through a focusing lens and laser window into a focal point in fuel/air mixture at intervals as needed to prevent extinction of fuel combustion, thereby reigniting or sustaining fuel combustion.

2. A method as recited in claim 1 wherein high peak power pulses are alternated with low peak power pulses.

3. A method as recited in claim 2 wherein said pulsed high peak power beam has a beam width in said focal point in the range from about 1 micron to about 300 microns.

4. A method as recited in claim 2 wherein said low peak power pulses have a beam width in said focal point in the range from about 1 micron to about 300 microns.

5. A method as recited in claim 2 wherein pulses of said pulsed high peak power beam have a repetition rate in the range from about 10 Hz to about 10,000 Hz and said low peak power pulses have a repetition rate in the range from about 10 Hz to about 10,000 Hz.

6. A method as recited in claim 2 wherein pulses of said pulsed high peak power beam have a peak power in the range from about 10 kW to about 10 GW.

7. A method as recited in claim 2 wherein said low peak power pulses have a peak power in the range from about 10 kW to about 100 MW.

8. A method as recited in claim 6 wherein pulses of said pulsed high peak power beam have a wavelength in the range from about 200 nanometers to about 12 microns.

9. A method as recited in claim 2 wherein pulses of said low peak power pulses have a wavelength in the range from about 200 nanometers to about 12 microns.

10. A method for flame stabilization comprising: focusing a pulsed high peak power beam from a laser through a focusing lens and laser window into a focal point in a fuel/air mixture at repeated intervals thereby reigniting or sustaining fuel combustion, said pulsed high peak power beam having a beam width in said focal point in the range from about 1 micron to about 300 microns.

11. A method as recited in claim 10 wherein pulses of said pulsed high peak power beam have a repetition rate in the range from about 10 Hz to about 10,000 Hz.

12. A method as recited in claim 2 wherein pulses of said pulsed high peak power beam have a peak power in the range from about 10 kW to about 10 GW.

13. A method as recited in claim 2 wherein pulses of said pulsed high peak power beam have a wavelength in the range from about 200 nanometers to about 12 microns.

14. An apparatus for flame stabilization comprising:

(a) a laser positioned to output a beam through a focusing lens and through a laser window into a focal point in a fuel combustion chamber;

(b) a nozzle arranged so as to introduce a fuel/air mixture into said fuel combustion chamber;

(c) at least one fuel supply source and at least one air supply source connected with said nozzle by conduits;

(d) devices to control pressure and amounts of air and fuel introduced into said nozzle; and (e) a feedback control system to detect flame light emission level and reactivate said laser whenever said flame light emission level decreases to a pre-set level, wherein said feedback control system comprises:

(f) a light collecting lens positioned to receive light emitted from said focal point;

(g) a photodiode positioned to receive light from said light collecting lens and transmit output to a photodiode signal level discriminator;

(h) a device for transmitting signals from said photodiode signal level discriminator to said laser, whereby said laser can be reactivated by said signals from said photodiode signal discriminator.

15. An apparatus as recited in claim 14 wherein said feedback control system is a device which monitors pressure in said fuel combustion chamber and reactivates said laser when said pressure in said fuel combustion chamber falls below a pre-set level.

16. An apparatus as recited in claim 14 wherein said feedback control system is a device which monitors flame temperature in said fuel combustion chamber and reactivates said laser when said flame temperature in said fuel combustion chamber falls below a pre-set level.

* * * * *